US008081301B2

(12) United States Patent
Stann et al.

(10) Patent No.: US 8,081,301 B2
(45) Date of Patent: Dec. 20, 2011

(54) LADAR TRANSMITTING AND RECEIVING SYSTEM AND METHOD (75) Inventors: Barry Lee Stann, Edgewater, MD (US); Mark M. Giza, Kensington, MD (US); William B. Lawler, Edgewater, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 307 days.

(21) Appl. No.: 12/575,506

(22) Filed: Oct. 8, 2009

(65) Prior Publication Data

US 2011/0085155 A1 Apr. 14, 2011

(51) Int. Cl.
*G01C 3/08* (2006.01)
(52) U.S. Cl. .................. 356/5.09; 356/4.01
(58) Field of Classification Search .............. 356/5.09, 356/4.01
See application file for complete search history.

(56) References Cited

U.S. PATENT DOCUMENTS

| 6,438,296 | B1 * | 8/2002 | Kongable .................. 385/43 |
| 2005/0156779 | A1 * | 7/2005 | Wixforth .................. 342/70 |
| 2005/0192727 | A1 * | 9/2005 | Shostak et al. ............ 701/37 |
| 2007/0024956 | A1 * | 2/2007 | Coyle .................. 359/333 |
| 2007/0115541 | A1 * | 5/2007 | Rogers et al. ............ 359/345 |
| 2007/0279615 | A1 * | 12/2007 | Degnan et al. ............ 356/4.01 |
| 2008/0018881 | A1 * | 1/2008 | Hui et al. ............ 356/5.09 |
| 2008/0030727 | A1 * | 2/2008 | Chin et al. ............ 356/318 |
| 2008/0074640 | A1 * | 3/2008 | Walsh et al. ............ 356/5.01 |
| 2008/0180690 | A1 * | 7/2008 | Hays et al. ............ 356/519 |

* cited by examiner

Primary Examiner — Thomas Tarcza
Assistant Examiner — Antoine J Bedard
(74) Attorney, Agent, or Firm — Alan I. Kalb (57) ABSTRACT A compact LADAR transmitting and receiving apparatus includes a pulse laser generating pulses of light; a transmitter collimating and directing the pulses of light toward a target; a receiver collecting reflected pulses of light, the reflected pulses of light having been reflected from the target, the receiver comprising a tapered fiber bundle; a sensor operatively connected to the tapered fiber bundle, where the sensor comprises a photosensitive region and outputs a photocurrent; an amplifier amplifying the photocurrent; and a power divider splitting the amplified photocurrent between a high gain channel and a low gain channel; a RF interface accepting the high gain channel, the low gain channel, and an undelayed sample of a pulse of light generated from the pulse laser as input; a processing unit accepting output from the RF interface; and a display unit displaying output from the processing unit.

20 Claims, 5 Drawing Sheets

LADAR TRANSMITTING AND RECEIVING SYSTEM AND METHOD

GOVERNMENT INTEREST

The embodiments herein may be manufactured, used, and/or licensed by or for the United States Government without the payment of royalties thereon.

BACKGROUND

1. Technical Field

The embodiments herein generally relate to a LADAR transmitting and receiving apparatus, and, more particularly, to a compact LADAR transmitting and receiving apparatus provided at a reduced cost and with reduced power requirements.

2. Description of the Related Art

Laser Detection And Ranging (LADAR) is an optical remote sensing technology that measures properties of scattered light to find range and/or other information of a distant target. LADAR may be used in a variety of contexts for elastic backscatter light detection and ranging (LIDAR) systems. Although the acronym LADAR is usually associated with the detection of hard targets and the acronym LIDAR is usually associated with the detection of aerosol targets, there has been no real standard on their use and both acronyms may be used interchangeably to describe the same laser ranging system.

While a LADAR system may perform similar functionality to a radar system, LADAR uses a much shorter wavelength of the electromagnetic spectrum compared to radar. For example, LADAR systems typically operate in the ultraviolet, visible, or near infrared spectrums. This gives a compact LADAR the ability to image a target at a high spatial resolution and allows LADAR systems to be made more physically compact.

In order for a LADAR system target to reflect a transmitted electromagnetic wave, an object needs to produce a dielectric discontinuity from its surroundings. At radar frequencies, a metallic object produces a dielectric discontinuity and a significant specular reflection. However, non-metallic objects, such as rain and rocks produce weaker reflections, and some materials may produce no detectable reflection at all, meaning some objects or features are effectively invisible at radar frequencies.

Lasers provide one solution to this problem regarding non-metallic detection. The beam power densities and coherency of lasers are excellent. Moreover, the wavelengths are much smaller than can be achieved with radio systems, and range from about 10 µm to around 250 nm. At such wavelengths, the waves are reflected very well from small objects such as molecules and atoms. This type of reflection is called diffuse "backscattering." Both diffuse and specular reflection may be used for different LADAR applications.

The transmitter and receiver functions (transceiver) of current LADAR systems typically rely on a mono-static optical system (i.e., the transmitted and received beams are co-axial) that is a complex assembly of beam splitters, polarizers, and steering mirrors. This arrangement is generally expensive, very difficult to align, prone to losing alignment, subject to narcissus, and requiring much more space than desired for a compact LADAR system.

In addition, current compact LADAR systems have generally been flawed by one or more factors including, low pixelization, insufficient range or range resolution, image artifacts, no daylight operation, large size, high power consumption, and high cost. Current LADAR systems frequently use a wide bandwidth photo detector/amplifier system with a small detector, and a low shunt capacitance, leading to an undesirable signal-to-noise ratio.

SUMMARY

In view of the foregoing, an embodiment herein provides a compact Laser Detection And Ranging (LADAR) system comprising a pulse laser generating pulses of light; a transmitter collimating and directing the pulses of light toward a target; a receiver collecting reflected pulses of light, the reflected pulses of light having been reflected from the target, the receiver comprising a tapered fiber bundle; a sensor operatively connected to the tapered fiber bundle, wherein the sensor comprises a photosensitive region and outputs a photocurrent; an amplifier amplifying the photocurrent; and a power divider splitting the amplified photocurrent between a high gain channel and a low gain channel; a radio frequency (RF) interface accepting the high gain channel, the low gain channel, and an undelayed sample of a pulse of light generated from the pulse laser as input; a processing unit accepting output from the RF interface; and a display unit displaying output from the processing unit.

In such a LADAR system, the pulse laser may comprise an Erbium fiber laser. In addition, the amplifier may comprise a microwave amplifier. Furthermore, the sensor may comprise an InGaAs PIN photo detector. Moreover, such a LADAR system may further comprise an analog-to-digital converter (ADC) coupled to the RF interface and the processing unit and sampling input from the RF interface to produce sampling data. Additionally, the processing unit may comprise a field programmable gate array (FPGA) processing sampling data from the ADC. Moreover, the processing unit may comprise a first-in-first-out (FIFO) memory storing sampling data from the ADC.

In such a LADAR system, the transmitter may comprise a microelectromechanical system (MEMS) mirror to direct pulses of light. In addition, the processing unit may control the MEMS mirror. Moreover, such a LADAR system may further comprise a telescope coupled to the MEMS mirror, where the pulses of light generated from the pulse laser are reflected from the MEMS mirror and are amplified in scan angle by the telescope. In addition, such a LADAR system may further comprise a high voltage amplifier producing analog voltages that controls a pointing direction of the MEMS mirror. Additionally, such a LADAR system may further comprise a digital-to-analog converter (DAC) coupled to the high voltage amplifier. Furthermore, the processing unit may be coupled to the DAC, and the processing unit may generate a digital signal to control the pointing direction of the MEMS mirror. Moreover, the processing unit may control the pulse laser in generating the pulses of light.

Another embodiment herein provides an apparatus for receiving pulses of light from a LADAR transmitter comprising a tapered fiber bundle; a plurality of sensors coupled to the tapered fiber bundle, wherein each sensor comprises a photosensitive region and outputs a photocurrent; a plurality of microwave amplifiers, wherein each amplifier is coupled to a sensor and amplifies the photocurrent; a plurality of feedback circuits, wherein each feedback circuit is coupled to an input and output of a microwave amplifier and raises the bandwidth of the circuit comprised of the sensor and the microwave amplifier; and a microwave combiner combining the photocurrent from each of the plurality of microwave amplifiers to a combined output.

In such an apparatus, the feedback circuit may comprise a single capacitor, a single resistor, and a single inductor. Moreover, the feedback circuit may comprise an LC circuit. In addition, the microwave amplifier may comprise a wideband monolithic microwave integrated circuit (MMIC) amplifier. Additionally, each of the plurality of sensors may comprise an InGaAs PIN photo detector.

In addition, an embodiment herein provides a method of processing pulses of light from a LADAR transmitter, the method comprising receiving the pulses of light via a tapered fiber bundle; producing a plurality of photocurrents, wherein each photocurrent is produced from a sensor coupled to the tapered fiber bundle and each sensor comprises a photosensitive region to output the photocurrent; amplifying the plurality of photocurrents using a plurality of microwave amplifiers, wherein each amplifier is coupled to a sensor and amplifies a photocurrent; providing a plurality of feedback circuits, wherein each feedback circuit is coupled to an input and output of a microwave amplifier and raises the bandwidth of the circuit comprised of the sensor and the microwave amplifier; combining the plurality of amplified photocurrents using a microwave combiner, wherein the number of inputs the microwave combiner accepts is as least as great as the number of microwave amplifiers; and processing and displaying the combined output.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a LADAR transmitting and receiving apparatus (or a LADAR transceiver), which facilitates the development of a compact, low-cost, and low-power LADAR imager for various applications, including small unmanned ground vehicles, and supports autonomous navigation, obstacle/collision avoidance, and target detection and identification functions in various applications, including small ground robots. Referring now to the drawings, and more particularly to FIGS. 1 through 5, where similar reference characters denote corresponding features consistently throughout the figures, there are shown preferred embodiments.

Figure 1:
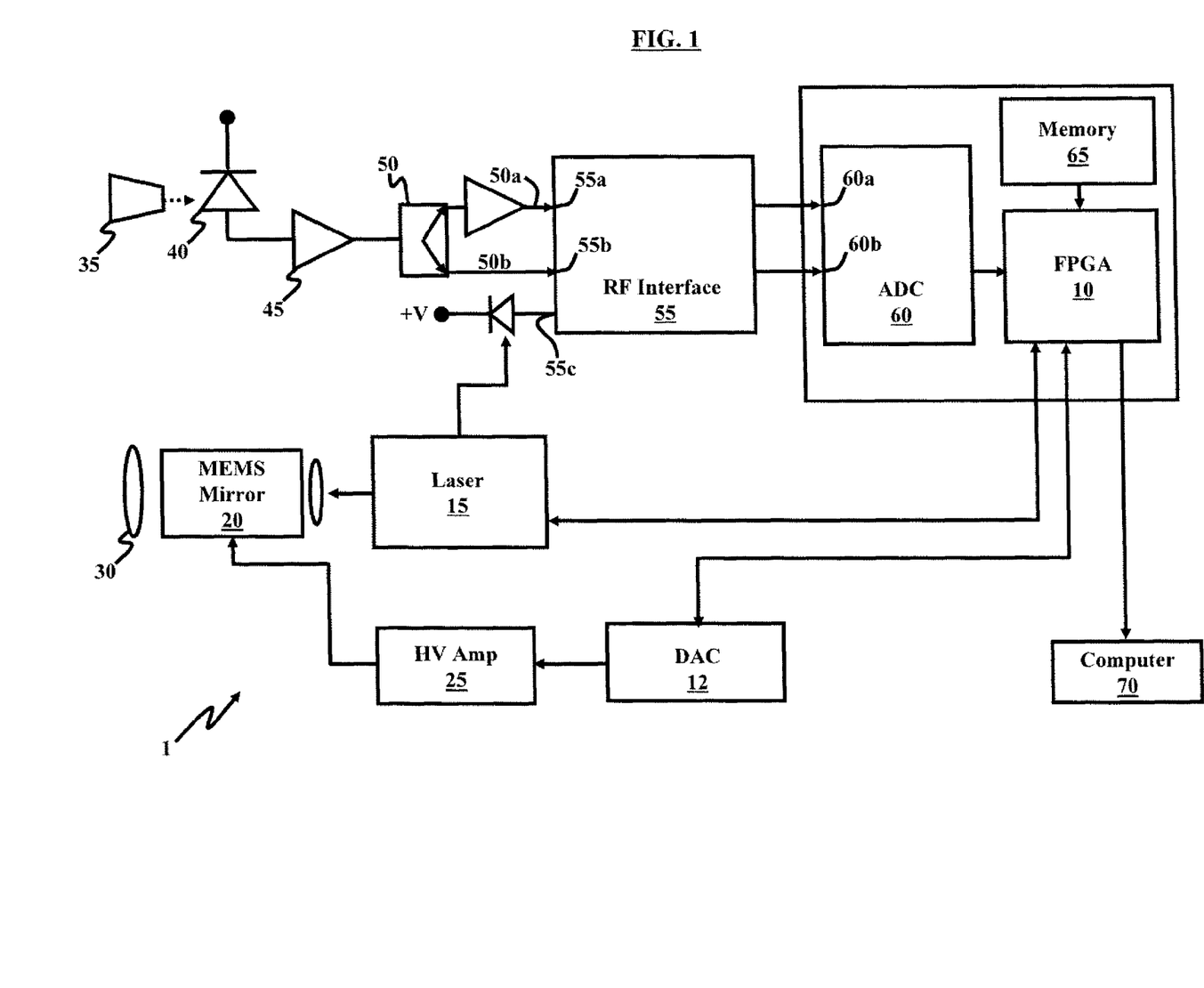
FIG. 1 illustrates a schematic diagram of LADAR transceiver according to the embodiments described herein.

FIG. 1 illustrates a schematic diagram of LADAR transceiver 1 according to an embodiment herein. In FIG. 1, a trigger signal from field-programmable gate array (FPGA) 10 commands laser 15 (e.g., an Erbium fiber laser) to emit a short pulses of light (e.g., 2-3 ns pulses, at 200 kHz). These pulses of light are collimated and then directed to the surface of mirror 20 (e.g., may be embodied as a small microelectromechanical system (MEMS) mirror). In addition, analog voltages from high voltage amplifier (HV Amp) 25 control the pointing direction of mirror 20. As the pulses of light are reflected from mirror 20, they are subsequently fed into telescope 30 to amplify the reflected angle.

Light backscattered upon hitting a target is collected on the large face of fiber bundle 35, which may be tapered. Tapering fiber bundle 35 effectively increases the diameter of photo detector 40 and thereby increases the signal-to-noise ratio. Photocurrent from photo detector 40 is fed into amplifier 45, which may be embodied as a monolithic 50 ohm microwave amplifier. The output of amplifier 45 is fed into power divider 50 splits the signal into low gain channel 50a and high gain channel 50b. In radio frequency (RF) interface board 55, both low gain channel 50a and high gain channel 50b are adjusted in amplitude and limited in amplitude to produce output channels 55a and 55b. In addition, inputs to RF interface board 55 are summed with a photocurrent from an undelayed sample of the original transmitted light signal, shown as T-zero 55c in FIG. 1. T-zero 55c pulse of the transmitted signal is optionally used as a reference to determine target range. Output channels 55a and 55b are subsequently feed into analog-to-digital converter (ADC) 60, shown in FIG. 1 as a two channel 8-bit ADC, via input channels 60a and 60b. ADC 60 optionally samples input channels 60a and 60b at a 1.5 giga-samples-per-second (GSPS) rate. This sampling data is fed to FPGA 10, which stores the sampling data as a function of time from ADC 60 in memory 65. Memory 65 is optionally a first-in first-out register (FIFO), and starts storing ADC 60 sampling data upon transmission of the laser 15 pulse. In addition to storing sampling data from ADC 60, FPGA 10 determines the range to the pixel, and formats the data for acquisition by computer 70 for display. FPGA 10 also controls the pointing direction of mirror 20 (e.g., via digital-to-analog converter (DAC) 12) and directs the laser 15 to emit a pulse.

To increase the receiver capture area for a given size of photo detector 40, a tapered fiber bundle 35 may be used to magnify the apparent size of a photo detector (e.g., a 1 mm diameter photo detector can theoretically increase its effective diameter to 3.1 mm at the front of a tapered fiber bundle, when the tapered fiber bundle 35 has a magnification ratio equal to 3.1:1). The theoretical maximal effect of magnifying tapered fiber bundle 35 is often not reached if photo detector 40 is a commercially packaged photo detector since the packaging of the commercial photo detectors typically cannot couple the output of tapered fiber bundle 35 directly against the detector surface of photo detector 40 to capture all of the light. In addition, the capacitance of photo detector 40 may limit the output bandwidth of amplifier 45 (e.g., a photo detector with a 1 mm diameter detecting surface may limit bandwidth to about 85 MHz when fed directly into a 50 ohm microwave amplifier). This issue is addressed via L-C circuit 75 (shown in FIG. 2) between photo detector 40 and amplifier 45 input to extend the bandwidth with a tolerable level of pulse distortion and stretching.

Figure 2:
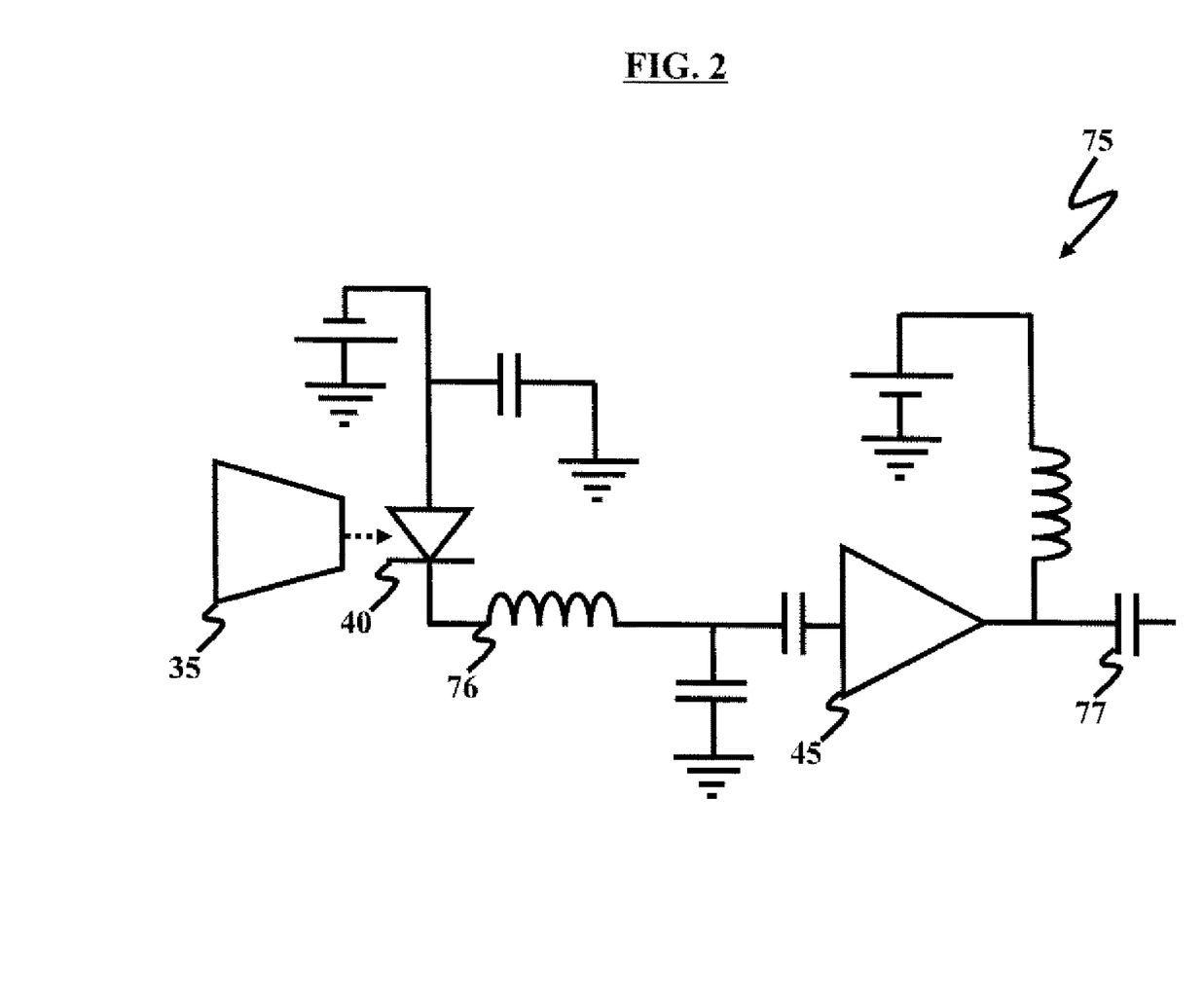
FIG. 2 illustrates a schematic diagram of an L-C circuit used with an LADAR receiver according to the embodiments described herein.

As shown in FIG. 2, photo detector 40 may include a PIN InGaAs photo detector. A PIN InGaAs photo detector is preferably used for photo detector instead of an avalanche photo detector. In addition, FIG. 2 shows L-C circuit 75 with 47 nH inductors 76 and 25 pF capacitors 77. Those skilled in the art, however, would recognize that L-C circuit 75 is not limited to what is illustrated in FIG. 2 or described above and could easily modify L-C circuit to other configurations without undue experimentation.

As shown in FIG. 1, photocurrent from photo detector 40 may be amplified by using one or more amplifiers 45. Each amplifier 45 in FIG. 1 is shown as a surface mounted monolithic microwave amplifier, which are typically low-cost. Furthermore, each amplifier 45 may have a bandwidth ranging from 1 to 7 GHz and yield power gains to 20 db with noise figures around 2.4 db. Although amplifier 45 is shown in FIG. 1 as a surface mounted monolithic microwave amplifier, embodiments described herein are not to such a configuration, and those skilled in the art could readily devise a different configuration without undue experimentation. Thus, FIG. 1 uses a low power and low noise figure model (as provided by amplifiers 45) for the first stage of photocurrent amplification. Output from a first amplifier 45 is then split by power divider 50 to create a low gain channel (50a) and a high gain channel (50b), which is fed into RF interface board 55.

Figure 3:
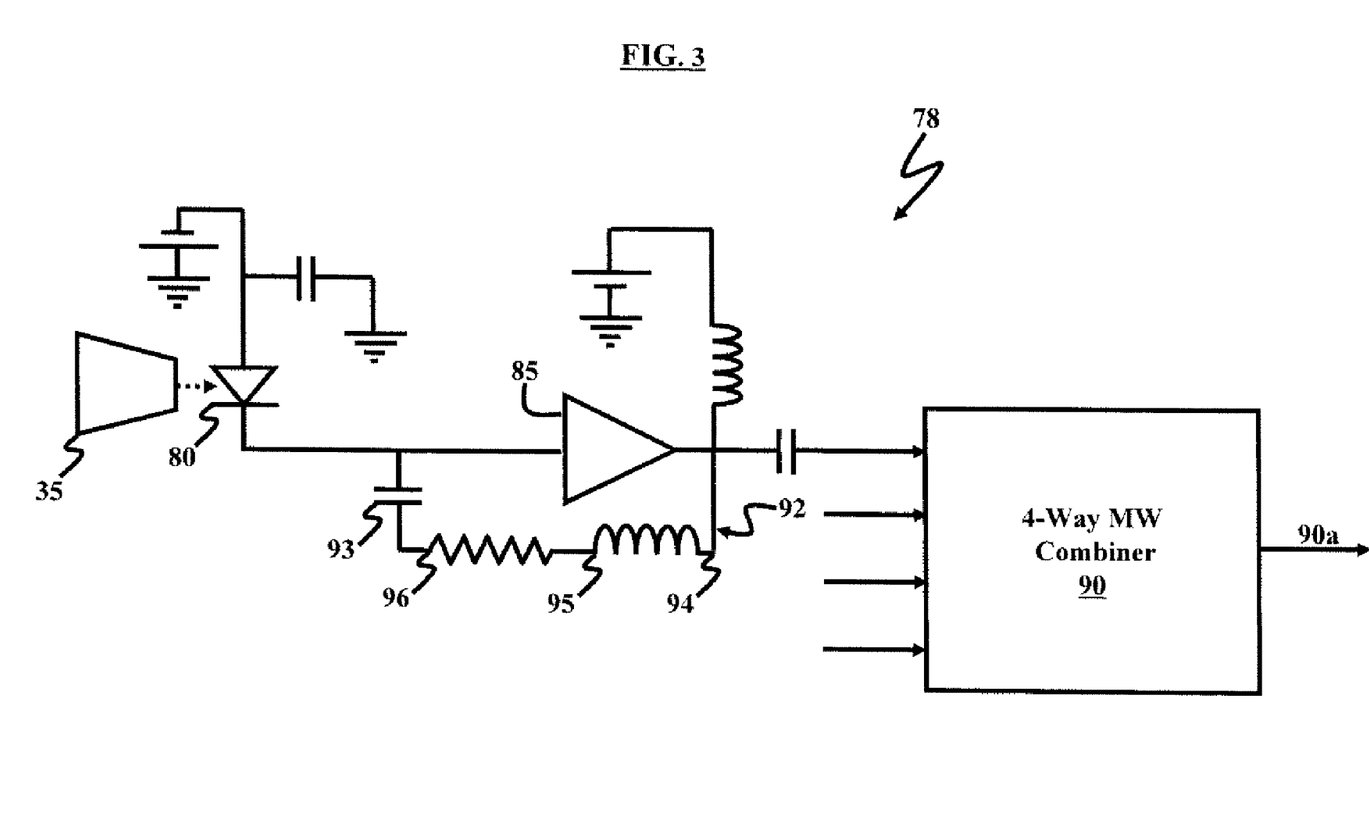
FIG. 3 illustrates a schematic diagram of a LADAR receiver according to the embodiments described herein.

Recent advances in Erbium fiber lasers have allowed Erbium fiber lasers to be manufactured as physically smaller units, and at a lower cost, than what was previously available. The electrical and optical parameters of these new Erbium fiber lasers are identical to the previous fiber laser technology except that the peak power has been reduced, e.g., the peak power of a low-cost Erbium fiber laser may be one-fourth of the peak power of a current fiber laser. FIG. 3 shows receiver 78 that compensates for a loss in signal power when using a laser with reduced peak power, according to the embodiments described herein. Similar to FIGS. 1 and 2, FIG. 3 includes fiber bundle 35 to enhance the optical capture area. FIG. 3, however, uses a plurality of chip detectors 80 instead of a single photo detector 40. For example, since each PIN chip detector 80 may be only 1 mm square, four PIN chip detectors 80 may be coupled to the output of fiber bundle 35. FIG. 3 illustrates a single PIN chip detector 80. The output of each PIN chip detector 80 is fed into a separate microwave amplifier 85. The output of each microwave amplifier 85 is fed into an n-way microwave combiner 90. Microwave combiner 90 yields target signal 90a that has an improved signal-to-noise ratio compared to the individual output of any of microwave amplifier 85.

Although FIG. 3 uses a four-way microwave combiner 90, to match the number of PIN chip detectors 80 and microwave amplifiers 85 combinations (only one of which is shown in FIG. 3), the embodiments described herein are not limited to a four-way microwave combiner and those skilled in the art could readily increase or decrease the number of inputs to microwave combiner 90 to match increases or decreases in the number of PIN chip detectors 80 and microwave amplifiers 85 combinations used.

The circuit shown in FIG. 3 also includes feedback circuit 92 positioned as a feedback loop for the output of microwave amplifier 85 to raise the overall bandwidth. In feedback circuit 92, capacitor 93 comprises a large capacitor used to decouple DC signal 94 at amplifier 85 output from the input. Inductor 95 (e.g., a 68 nH inductor) cuts-off the feedback path at high frequencies, where the phase shifts in amplifier 85 may cause conditions for oscillations. In addition, resistor 96 (e.g., a 360Ω resistor) is effectively the actual feedback element over the bandwidth of interest. To further achieve stable (e.g., non-oscillating) performance, amplifier 85 may include a wideband monolithic microwave integrated circuit (MMIC) amplifier (e.g., to provide gain up to 7 GHz).

Figure 4:
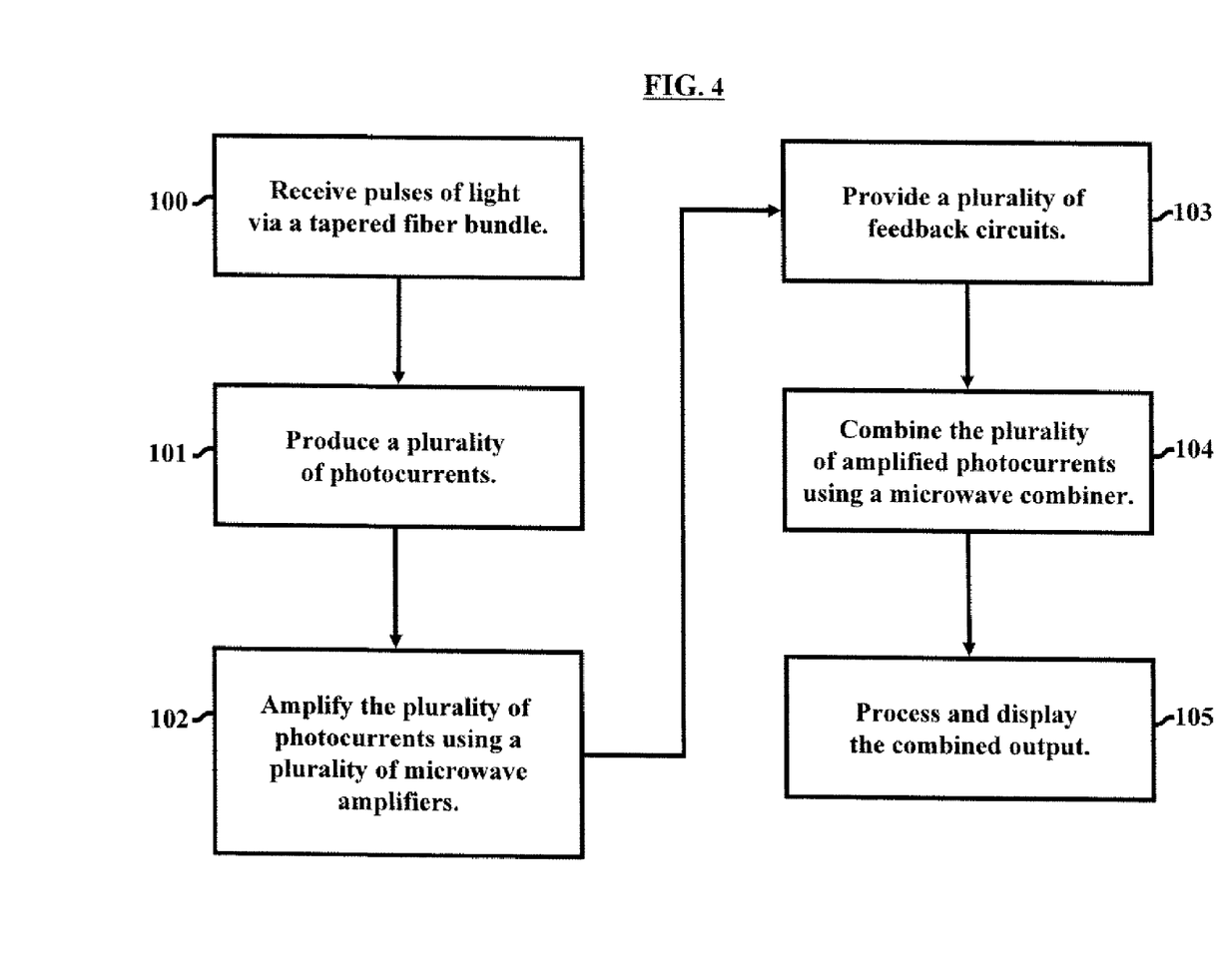
FIG. 4 is a flow diagram illustrating a preferred method according to an embodiment herein.

FIG. 4, with reference to FIGS. 1 through 3, illustrates a flow diagram according to an embodiment herein. In step 100, the method of FIG. 4 describes receiving pulses of light via a tapered fiber bundle (e.g., tapered fiber bundle 35). Step 101 describes producing a plurality of photocurrents (e.g., as produced from photo detector 40). Step 102 describes amplifying the plurality of photocurrents using a plurality of microwave amplifiers (e.g., microwave amplifiers 45). Next, at step 103, the method of FIG. 4 provides a plurality of feedback circuits (e.g., feedback circuit 92). Step 104 describes combining the plurality of amplified photocurrents using a microwave combiner (e.g., microwave combiner 90). In step 105, the method of FIG. 4 describes processing and displaying the combined output (e.g., via computer 70).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. In addition, the hardware elements described herein may be simulated in software. For example, computer models of analog hardware elements described herein (e.g., lasers, microwave amplifiers, resistors, capacitors, and inductors) may be used in conjunction with emulators for discrete hardware elements described herein (e.g., FPGA emulators) to simulate operational parameters for the software elements of the embodiments described herein. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
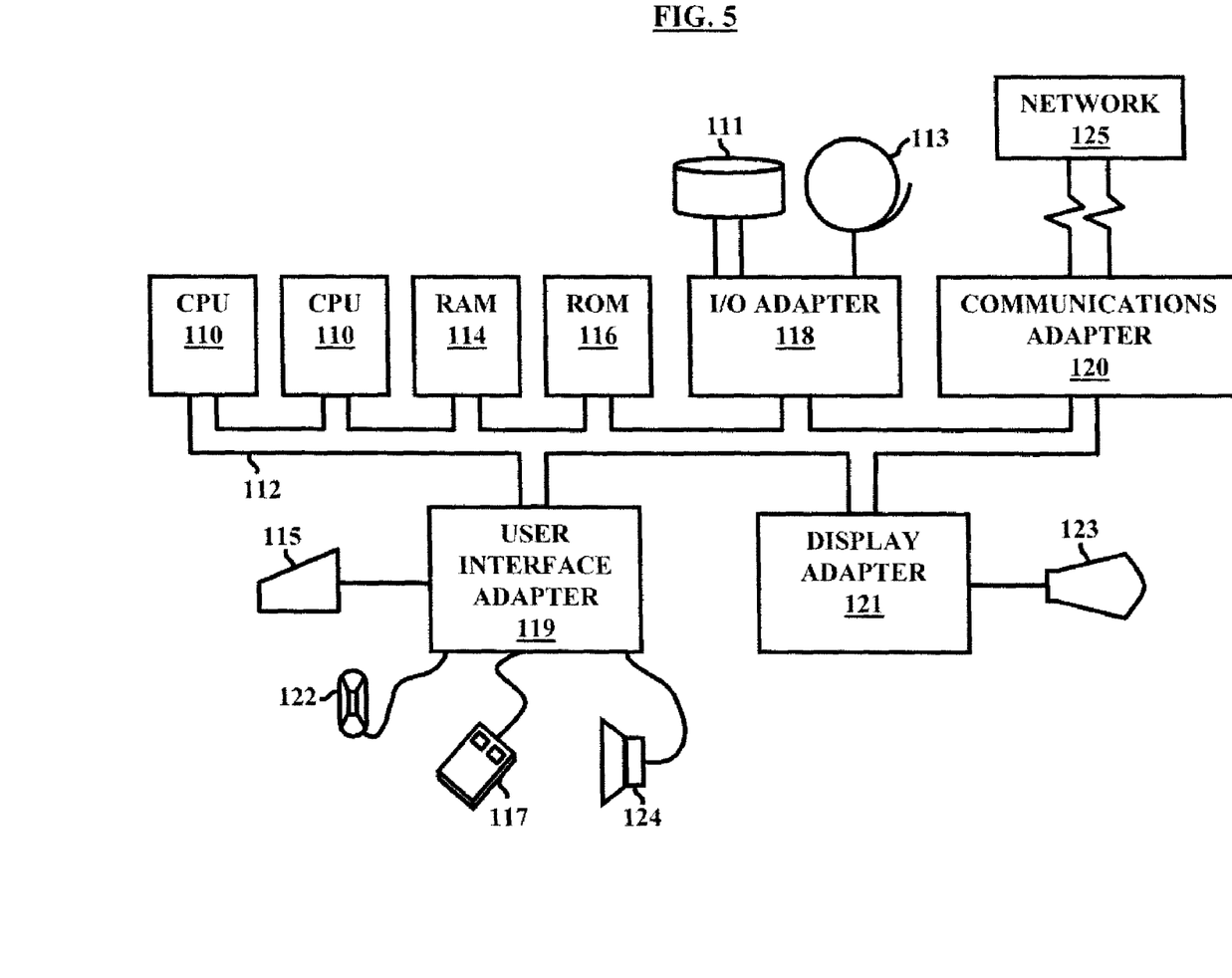
FIG. 5 illustrates a schematic diagram of a computer architecture used in accordance with the embodiments herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A compact Laser Detection And Ranging (LADAR) system comprising:
    a pulse laser generating pulses of light;
    a transmitter collimating and directing said pulses of light toward a target;
    a receiver collecting reflected pulses of light, said reflected pulses of light having been reflected from said target, said receiver comprising:
        a tapered fiber bundle;
        a sensor operatively connected to said tapered fiber bundle, wherein said sensor comprises a photosensitive region and outputs a photocurrent;
        an amplifier amplifying said photocurrent; and
        a power divider splitting the amplified photocurrent between a high gain channel and a low gain channel;
    a radio frequency (RF) interface accepting said high gain channel, said low gain channel, and an undelayed sample of a pulse of light generated from said pulse laser as input;
    a processing unit accepting output from said RF interface; and
    a display unit displaying output from said processing unit.

2. The LADAR system of claim 1, wherein said pulse laser comprises an Erbium fiber laser.

3. The LADAR system of claim 1, wherein said amplifier comprises a microwave amplifier.

4. The LADAR system of claim 1, wherein said sensor comprises an InGaAs PIN photo detector.

5. The LADAR system of claim 1, further comprising an analog-to-digital converter (ADC) coupled to said RF interface and said processing unit and sampling input from said RF interface to produce sampling data.

6. The LADAR system of claim 5, wherein said processing unit comprises a field programmable gate array (FPGA) processing sampling data from said ADC.

7. The LADAR system of claim 5, wherein said processing unit comprises a first-in-first-out (FIFO) memory storing sampling data from said ADC.

8. The LADAR system of claim 1, wherein said transmitter comprises a microelectromechanical system (MEMS) mirror to direct pulses of light.

9. The LADAR system of claim 8, wherein said processing unit controls said MEMS mirror.

10. The LADAR system of claim 8, further comprising a telescope coupled to said MEMS mirror, wherein said pulses of light generated from said pulse laser are reflected from said MEMS mirror is amplified by said telescope.

11. The LADAR system of claim 8, further comprising a high voltage amplifier producing analog voltages that controls a pointing direction of said MEMS mirror.

12. The LADAR system of claim 11, further comprising a digital-to-analog converter (DAC) coupled to said high voltage amplifier.

13. The LADAR system of claim 12, wherein said processing unit is coupled to said DAC, and wherein said processing unit generates a digital signal to control said pointing direction of said MEMS mirror.

14. The LADAR system of claim 1, wherein said processing unit controls said pulse laser in generating said pulses of light.

15. An apparatus for receiving pulses of light from a Laser Detection And Ranging (LADAR) transmitter comprising:
   a tapered fiber bundle;
   a plurality of sensors coupled to said tapered fiber bundle, wherein each sensor comprises a photosensitive region and outputs a photocurrent;
   a plurality of microwave amplifiers, wherein each amplifier is coupled to a sensor and amplifies said photocurrent;
   a plurality of feedback circuits, wherein each feedback circuit is coupled to an input and output of a microwave amplifier and raises the bandwidth of a circuit comprising said sensor and said microwave amplifier; and
   a microwave combiner combining said photocurrent from each of said plurality of microwave amplifiers to a combined output.

16. The apparatus of claim 15, wherein said feedback circuit comprises a single capacitor, a single resistor, and a single inductor.

17. The apparatus of claim 15, wherein said feedback circuit comprises an LC circuit.

18. The apparatus of claim 15, wherein said microwave amplifier comprises a wideband monolithic microwave integrated circuit (MMIC) amplifier.

19. The apparatus of claim 15, wherein each of said plurality of sensors comprises an InGaAs PIN photo detector.

20. A method of processing pulses of light from a Laser Detection And Ranging (LADAR) transmitter, said method comprising:
   receiving said pulses of light via a tapered fiber bundle;
   producing a plurality of photocurrents, wherein each photocurrent is produced from a sensor coupled to said tapered fiber bundle and each sensor comprises a photosensitive region to output said photocurrent;
   amplifying said plurality of photocurrents using a plurality of microwave amplifiers, wherein each amplifier is coupled to a sensor and amplifies a photocurrent;
   providing a plurality of feedback circuits, wherein each feedback circuit is coupled to an input and output of a microwave amplifier and raises the bandwidth of a circuit comprising said sensor and said microwave amplifier;
   combining said plurality of amplified photocurrents using a microwave combiner, wherein the number of inputs said microwave combiner accepts is as least as great as the number of microwave amplifiers; and
   processing and displaying said combined output.

* * * * *